(12) United States Patent
Kawanishi

(10) Patent No.: US 11,039,060 B2
(45) Date of Patent: Jun. 15, 2021

(54) IMAGE CAPTURING APPARATUS AND FOCUS CONTROL METHOD

(71) Applicant: CANON KABUSHIKI KAISHA, Tokyo (JP)

(72) Inventor: Atsuya Kawanishi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/913,817

(22) Filed: Jun. 26, 2020

(65) Prior Publication Data

US 2020/0412970 A1 Dec. 31, 2020

(30) Foreign Application Priority Data

Jun. 28, 2019 (JP) .............................. JP2019-122100

(51) Int. Cl.
*H04N 5/232* (2006.01)

(52) U.S. Cl.
CPC ... *H04N 5/232127* (2018.08); *H04N 5/23219* (2013.01); *H04N 5/232133* (2018.08)

(58) Field of Classification Search
CPC ......... H04N 5/232127; H04N 5/23219; H04N 5/232133
USPC ...................................................... 348/222.1
See application file for complete search history.

(56) References Cited

U.S. PATENT DOCUMENTS

| 7,574,128 | B2* | 8/2009 | Matsuda | H04N 5/23219 396/264 |
| 7,817,915 | B2* | 10/2010 | Sugimoto | H04N 5/232123 396/264 |
| 7,848,633 | B2* | 12/2010 | Sugimoto | H04N 5/232123 396/264 |
| 8,194,140 | B2* | 6/2012 | Suzuki | H04N 5/23218 348/208.16 |
| 8,269,851 | B2* | 9/2012 | Hada | H04N 5/232941 348/222.1 |
| 10,666,864 | B2* | 5/2020 | Takahashi | H04N 5/23238 |
| 2001/0053292 | A1* | 12/2001 | Nakamura | H04N 5/23218 396/661 |
| 2006/0197845 | A1* | 9/2006 | Masaki | H04N 5/23264 348/224.1 |
| 2007/0237513 | A1* | 10/2007 | Sugimoto | H04N 5/23218 396/123 |
| 2007/0274703 | A1* | 11/2007 | Matsuda | G03B 13/12 396/264 |
| 2008/0025710 | A1* | 1/2008 | Sugimoto | H04N 5/23219 396/48 |

(Continued)

FOREIGN PATENT DOCUMENTS

JP 2013-117650 A 6/2013

*Primary Examiner* — Pritham D Prabhakher
(74) *Attorney, Agent, or Firm* — Cowan, Liebowitz & Latman, P.C.

(57) ABSTRACT

An image capturing apparatus comprising: an image sensor that repeatedly shoots a subject and outputs image signals; a detection unit that detect a predetermined subject from the image signals; a determination unit that determines whether or not a selfie mode for shooting a photographer himself/herself is set; and a setting unit that sets a focus detection area where focus detection is performed, wherein the setting unit sets a predetermined focus detection area in a case where the detection unit has failed to detect the predetermined subject and it is determined by the determination unit that the selfie mode is set.

12 Claims, 6 Drawing Sheets

(56) References Cited

U.S. PATENT DOCUMENTS

| | | | |
|---|---|---|---|
| 2009/0079844 A1* | 3/2009 | Suzuki | G03B 13/36 |
| | | | 348/222.1 |
| 2010/0158491 A1* | 6/2010 | Sugimoto | H04N 5/23218 |
| | | | 396/48 |
| 2010/0225773 A1* | 9/2010 | Lee | H04N 5/23219 |
| | | | 348/222.1 |
| 2016/0182800 A1* | 6/2016 | Kaneko | H04N 5/23203 |
| | | | 348/211.4 |
| 2019/0037143 A1* | 1/2019 | Tsubusaki | H04N 5/23245 |
| 2019/0182422 A1* | 6/2019 | Takahashi | H04N 5/23219 |

* cited by examiner

IMAGE CAPTURING APPARATUS AND FOCUS CONTROL METHOD

BACKGROUND OF THE INVENTION

Field of the Invention

The present invention relates to an image capturing apparatus and a focus control method.

Description of the Related Art

Conventionally, a contrast AF method is well known as a focus detection method used in an automatic focus detection device of a camera. In the contrast AF method, a high-frequency component is extracted from an image signal obtained by using an image sensor, a contrast evaluation value indicating a focus state is obtained, and the position of a focus lens is controlled so that the contrast evaluation value becomes maximum.

In such a conventional contrast AF method, it is difficult to achieve both responsiveness and tracking performance, and stability and quality. Therefore, when shooting a moving image that requires natural focusing, it has been common to design a device for the AF method by giving priority to the latter, namely, stability and quality. In particular, in a state in which a specific subject such as a face was not detected in an automatic selection mode for detecting a focus adjustment area, it was considered important to appropriately set an object on which the camera focuses in the entire screen image being shot.

On the other hand, in recent years, use cases of moving image shooting have been diversified due to the spread of SNS and the like, and functions such as a so-called selfie mode for shooting the photographer himself/herself have been enhanced. Japanese Patent Laid-Open No. 2013-117650 discloses a method of performing AF control in a selfie mode.

In the AF control for a moving image with priority given to stability, when a specific subject such as a face is detected, focus adjustment is performed by setting a main AF frame 601 on the detected subject and, if necessary, setting the auxiliary AF frame 602 around the main AF frame 601 as shown in FIG. 6A. On the other hand, when the specific subject is not detected, as shown in FIG. 6B, a main AF frame 603 is arranged at a predetermined fixed position, and an auxiliary AF frame 604 is arranged around it as needed. In addition to this, an entire AF frame 605 for setting the entire screen as an AF adjustment area may be set.

On the other hand, in the AF control for a moving image with priority given to stability, even when the center of the screen is greatly blurred, focusing is not actively performed when the periphery is in focus. Therefore, depending on the composition, there is a problem that a phenomenon that the center subject is out of focus occurs. In particular, in the state of taking a selfie, there are many cases where a subject is placed so as to hide the face as shown in FIG. 6C, and a composition in which a main subject is present at the center of the screen even if no face is detected is often used, so that the above-mentioned problem is liable to occur.

Japanese Patent Laid-Open No. 2013-117650 discloses means for preferentially focusing on a face detected in the selfie mode, but does not mention focus control when a face is not detected.

SUMMARY OF THE INVENTION

The present invention has been made in consideration of the above situation, and increases chances of focusing on a main subject when shooting a moving image in a selfie mode.

According to the present invention, provided is an image capturing apparatus comprising: an image sensor that repeatedly shoots a subject and outputs image signals; a detection unit that detect a predetermined subject from the image signals; a determination unit that determines whether not a selfie mode for shooting a photographer himself/herself is set; and a setting unit that sets a focus detection area where focus detection is performed, wherein the setting unit sets a predetermined focus detection area in a case where the detection unit has failed to detect the predetermined subject and it is determined by the determination unit that the selfie mode is set, and wherein each unit is implemented by one or more processors, circuitry or a combination thereof.

Further, according to the present invention, provided is a focus control method comprising: repeatedly shoots a subject and outputting image signals; detecting a predetermined subject from the image signals; determining whether not a selfie mode for shooting a photographer himself/herself is set; and setting a focus detection area where focus detection is performed, wherein a predetermined focus detection area is set as the focus detection area in a case where the predetermined subject is not detected and it is determined that the selfie mode is set.

Furthermore, according to the present invention, provided is a non-transitory computer-readable storage medium, the storage medium storing a program that is executable by the computer, wherein the program includes program code for causing the computer to perform a focus control method comprising: repeatedly shoots a subject and outputting image signals; detecting a predetermined subject from the image signals; determining whether not a selfie mode for shooting a photographer himself/herself is set; and setting a focus detection area where focus detection is performed, wherein a predetermined focus detection area is set as the focus detection area in a case where the predetermined subject is not detected and it is determined that the selfie mode is set.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
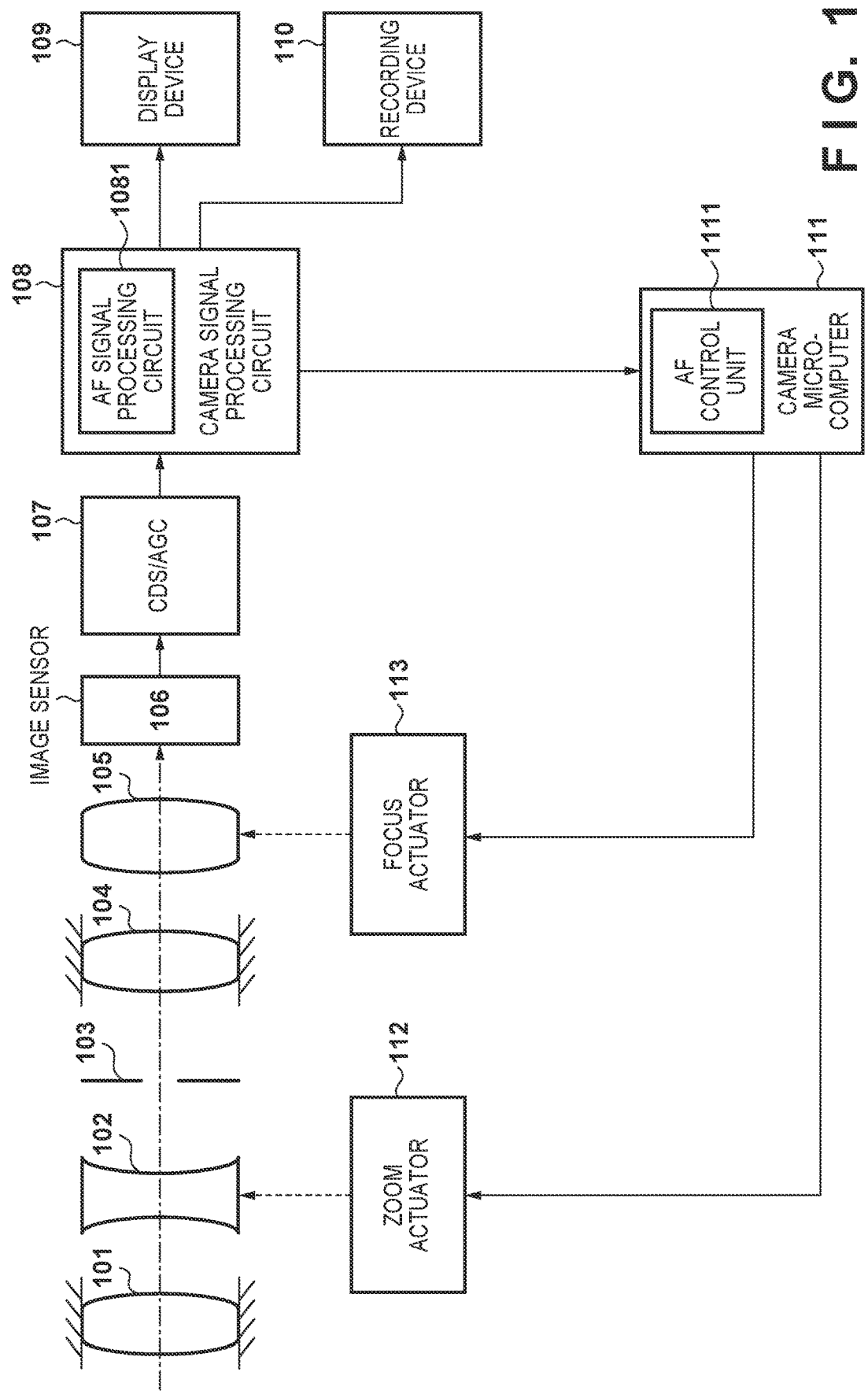
FIG. 1 is a block diagram showing a schematic configuration of a camera system according to a first embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

A first embodiment of the present invention will be described below. FIG. 1 is a block diagram showing a schematic configuration of a camera system according to the first embodiment.

Light from a subject passes through an imaging optical system and forms a subject image on an image sensor 106. The imaging optical system includes a first fixed lens 101, a zoom lens 102, a diaphragm 103 for adjusting an amount of light, a second fixed lens 104, and a focus lens 105 in order from the subject side. The zoom lens 102 is driven by a zoom actuator 112 and moves in the optical axis direction to perform zooming. The focus lens 105 has both a focus function and a function of correcting an image plane variation accompanying zooming, and is driven by a focus actuator 113. Note that, in FIG. 1, each lens is represented by a single lens, however, may be composed of a single lens, or may be composed of a plurality of lenses.

The image sensor 106 is a CCD sensor or a CMOS sensor, for example, and includes a photoelectric conversion element, and photoelectrically converts the subject image and outputs an analog signal. A CDS/AGC/AD converter 107 samples the output of the image sensor 106, and further performs gain adjustment and digital conversion.

A camera signal processing circuit 108 performs various types of image processes on an output signal from the CDS/AGC/AD converter 107 to generate an image signal. The camera signal processing circuit 108 includes an AF signal processing circuit 1081. The AF signal processing circuit 1081 generates a focus signal by extracting high-frequency component, a luminance difference component generated from a high-frequency signal, or the like, based on an image signal of pixels in an area (AF area) used for focus detection among image signals output from the CDS/AGC/AD converter 107. Here, the focus signal is a signal representing the evaluation value of the contrast, and represents the sharpness (contrast state) of the image generated from the output signal of the image sensor 106. The sharpness changes depending on the focus state of the imaging optical system, and as a result, the focus signal is a signal representing the focus state of the imaging optical system.

A display device 109 displays an image signal from the camera signal processing circuit 108. A recording device 110 records the image signal from the camera signal processing circuit 108 on a recording medium such as a magnetic tape, an optical disk, and a semiconductor memory.

A camera microcomputer 111 controls the entire camera system. The control includes moving the focus lens 105 in the optical axis direction via the focus actuator 113 based on the output from the camera signal processing circuit 108.

Note that this control is mainly performed by an AF control unit 1111 provided in the camera microcomputer 111.

The AF control unit 1111 controls the focus actuator 113 according to the determined target position of the focus lens 105 to perform focus control. Further, at the time of zooming, zoom tracking control for moving the focus lens 105 based on zoom tracking data (zoom tracking cam) stored in advance is performed. This prevents image plane fluctuation (blur) due to zooming. The details of the control by the AF control unit 1111 in the first embodiment will be described later.

The zoom actuator 112 and the focus actuator 113 are constituted by actuators such as a stepping motor, a DC motor, a vibration motor and a voice coil motor, and are controlled by the camera microcomputer 111 as described above.

Next, an outline of the AF control for a moving image performed by the camera microcomputer 111 in the first embodiment will be described with reference to FIGS. 2 to 4D. Before that, a monitoring operation, a wobbling operation, and a search operation performed by the AF control for a moving image will be briefly described here.

The monitoring operation is an operation of monitoring the current focus signal while keeping the focus lens 105 stopped, and monitoring whether or not a change of a predetermined amount or more of the focus signal has occurred with respect to a focus signal at the time when in-focus state was detected most recently.

In the wobbling operation, the focus lens 105 is continuously reciprocated in the optical axis direction based onset driving amount parameters, and moves the center position of the reciprocal movement in the direction in which the focus signal increases while confirming the magnitude relationship between the focus signals on the nearest side and the infinity side of the reciprocal movement. Here, the driving amount parameters indicates amounts of movement of image plane per one reciprocal movement and per one displacement of the center position of the focus lens 105. Normally, these are set within the depth of focus in consideration of the quality of the focusing process, but basically they can be freely determined based on the performance target of the camera and the drive characteristics of a moving image compatible lens for focusing.

The search operation is an operation of driving the focus lens 105 at a predetermined speed in the optical axis direction based on a set driving speed parameter to search for a position where the focus signal becomes maximum. Here, the driving speed parameter refers to a moving amount of image plane per unit time accompanying movement of the focus lens 105. Normally, this is set within the depth of focus in consideration of the quality of the focusing process, but basically they can be freely determined based on the performance target of the camera and the drive characteristics of the moving image compatible lens for focusing.

In the AF control for a moving image, the AF control is performed while transiting between the monitoring operation, the wobbling operation, and the search operation according to the obtained focus signal.

Figure 2:
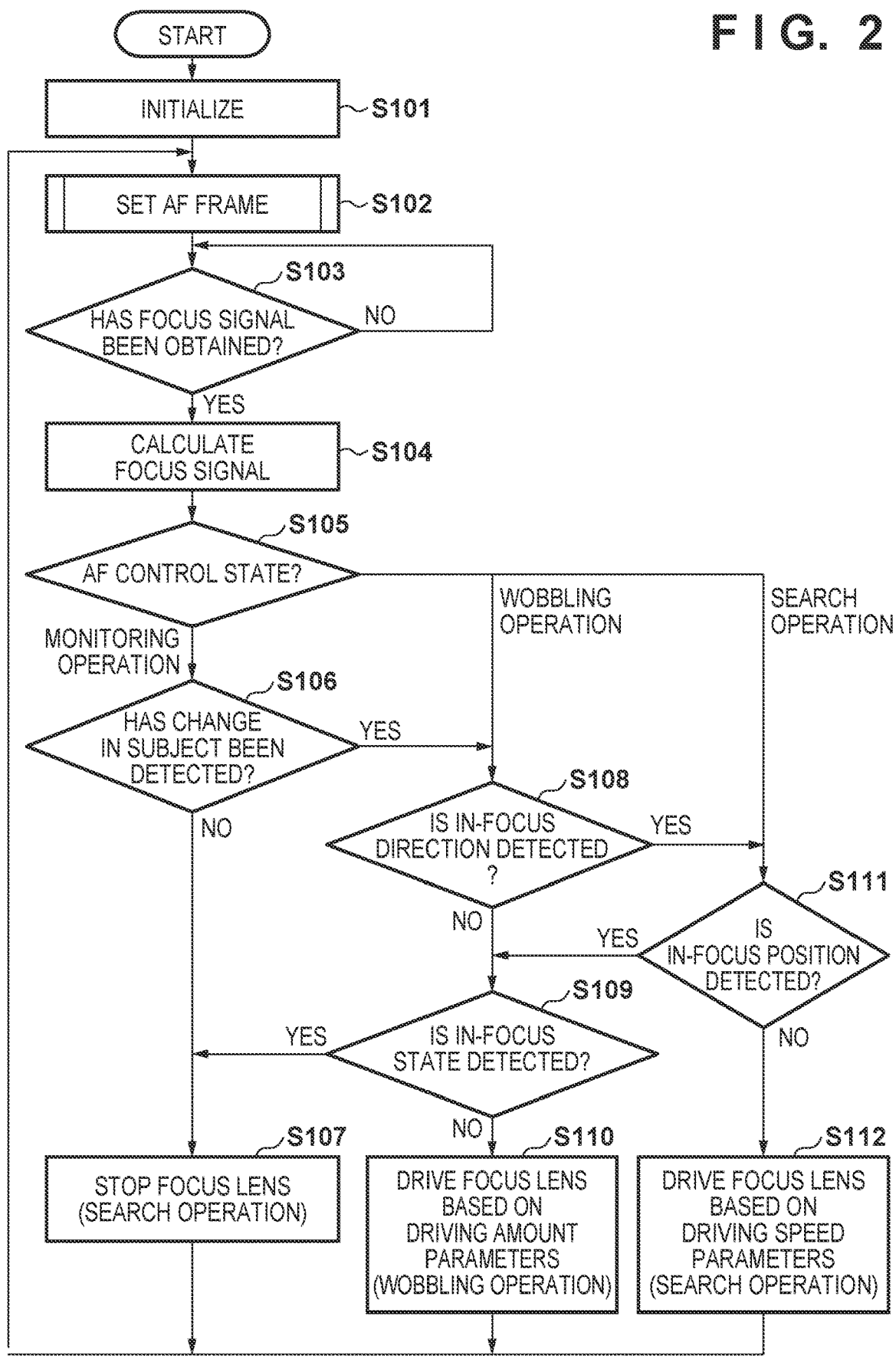
FIG. 2 is a flowchart of AF control for a moving image according to the first embodiment.

FIG. 2 is a flowchart showing the overall flow of the AF control for a moving image. The processing here is mainly performed by the AF control unit 1111 in the camera microcomputer 111 executing a computer program.

First, in step S101, an initialization process is performed, and a wobbling operation is set as a state of the AF control.

In step S102, a focus detection area (AF frame) indicating an area for acquiring a focus signal in AF signal processing circuit 1081 is set. The detailed operation of setting the AF frame performed here will be described later with reference to FIG. 3.

In step S103, it is determined whether or not the focus signals of the areas corresponding to all the AF frames set by the AF signal processing circuit 1081 in step S102 have been obtained, and if yes, the process proceeds to step S104.

In step S104, the focus signal for each AF frame acquired in step S103 is synthesized as needed, and a focus signal to be used in a focus adjustment operation is calculated.

In step S105, the current AF control state is determined, and the process proceeds to step S106 if the monitoring operation is being performed, to step S108 if the wobbling operation is being performed, or to step S111 if the search operation is being performed.

In step S106, since the monitoring operation is being performed, the focus signal obtained in step S104 is compared with the focus signal obtained last time to determine whether or not a change in the subject by a predetermined amount or more at which AF control should be restarted is detected. If it is determined that the change in the subject by the predetermined amount or more has been detected, the process proceeds to step S108; otherwise, the process proceeds to step S107.

In step S107, the focus lens 105 is stopped in the course of the monitoring operation.

In step S108, it is determined whether or not the direction in which the in-focus position exists can be detected from the focus signal obtained in step S104 and the focus signals obtained up to the previous loop. Here, as an example of detecting the direction in which the in-focus position exists, when the center position of reciprocal movement moves in the same direction continuously for a predetermined number of times from the history of the position of the focus lens 105, that direction is determined as the direction in which the in-focus position exists. If it is determined that the direction in which the in-focus position exists can be detected, the process proceeds to step S111; otherwise, the process proceeds to step S109. Note that, in the case where the transition has been made from step S106, since the monitoring operation is performed, the focus lens 105 has been stopped in the previous state of the AF control. Therefore, the center position of reciprocal movement has not moved in the same direction continuously for a predetermined number of times, the determination result in step S108 is always NO, and the process moves to step S109.

In step S109, the focus signal obtained in step S104 is compared with the focus signals obtained up to the previous loop, and it is determined whether or not the in-focus state is detected. Here, as an example of determining that the in-focus state is detected, it is determined that the in-focus state is detected in a case where that the focus lens 105 has reciprocated in the same area a predetermined number of times from the history of the positions of the focus lens 105. If it is determined that the in-focus state is detected, the flow moves to step S107, where the monitoring operation is started and the focus lens 105 is stopped; otherwise moves to step S110. Note that, in the case where the transition has been made from step S106, since the monitoring operation is performed, the focus lens 105 has been stopped in the previous state of the AF control. Therefore, the focus lens 105 has not reciprocated in the same area the predetermined number of times, the determination result in step S109 is always NO, and the process moves to step S110. Further, in the case where the transition has been made from step S111 which will be described later, since the search operation is performed, the focus lens 105 has not reciprocated in the same area the predetermined number of times, the determination result in step S109 is always NO, and the process moves to step S110.

In step S110, the focus lens 105 is moved based on the driving amount parameters as the wobbling operation.

In step S111, the focus signal obtained in step S104 is compared with the focus signals obtained up to the previous loop, and it is determined whether or not the in-focus position is detected. If it is determined that the in-focus position is detected, the process proceeds to step S109; otherwise, the process proceeds to step S112. Here, as an example of determining that the in-focus position is detected, it is determined that the in-focus position is detected in a case where the value of the focus signal has decreased by a predetermined amount or more from the maximum value. Note that in a case where the transition has been made from step S108, since the direction in which the in-focus position exists is detected, the determination result in step S111 is always NO, and the process moves to step S112.

In step S112, as the search operation, the focus lens 105 is driven based on the driving speed parameter.

Thus, in the AF control for a moving image performed by the AF control unit 1111 in the camera microcomputer 111, the focus lens 105 is controlled while repeating the monitoring operation, the wobbling operation, and the search operation so that the focus signal is always maximized. Thus, the in-focus state can be maintained.

Subsequently, the details of the AF frame setting performed in step S102 will be described with reference to FIG. 3 and FIGS. 4A to 4D.

Figure 3:
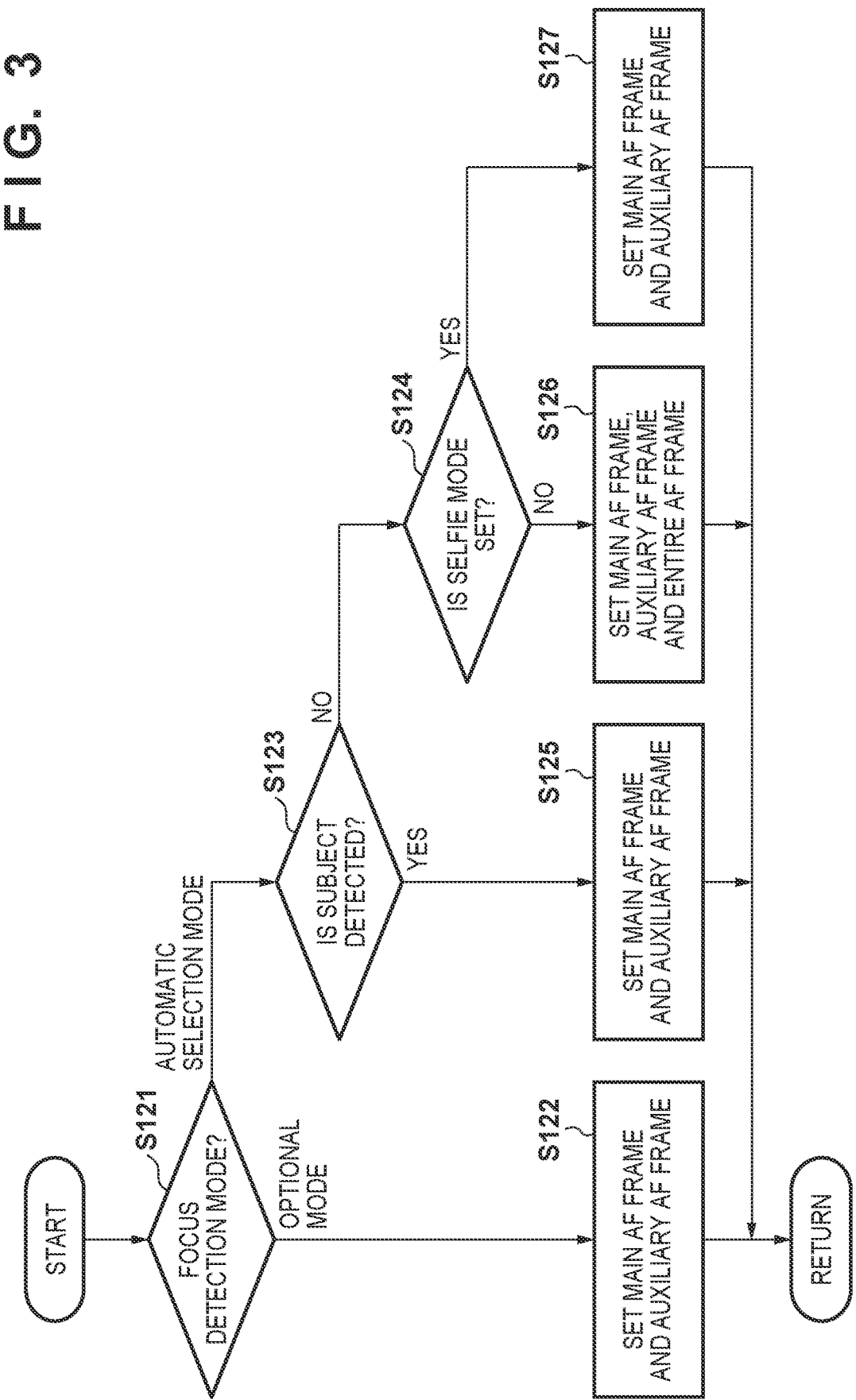
FIG. 3 is a flowchart of an AF frame setting processing according to the first embodiment.

In FIG. 3, the current setting of the focus detection mode is determined in step S121, and the process proceeds to step S122 if the mode is an optional mode and to step S123 if the mode is an automatic selection mode.

Figure 4A:
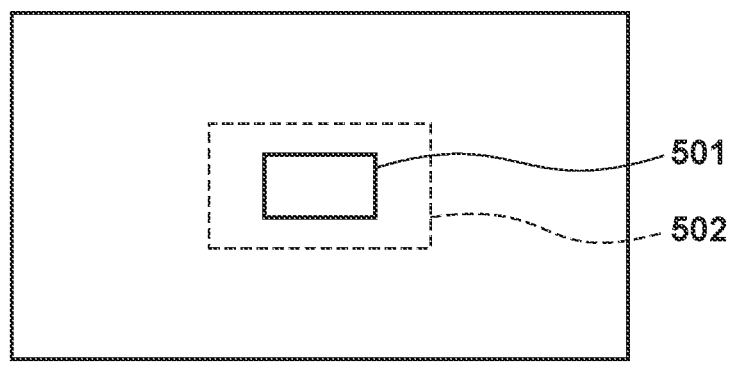
FIGS. 4A to 4D are diagrams showing examples of the arrangement of AF frames according to the first embodiment.

In step S122, the AF frame setting in the optional mode is performed. FIG. 4A shows an example of setting an AF frame when the focus detection mode is the optional mode. A user can set a main AF frame 501 at an arbitrary position while monitoring the display device 109. FIG. 4A shows an example in which the main AF frame 501 is set near the center of the screen, however, it may be set at an arbitrary position within the shooting area. At this time, an auxiliary AF frame 502 including the main AF frame 501 and larger than the main AF frame 501 is set at the same time.

In step S123, it is determined whether or not a specific subject such as a face is automatically detected by the camera. If it is determined that the subject is detected, the process proceeds to step S125; otherwise, the process proceeds to step S124.

Figure 4B:
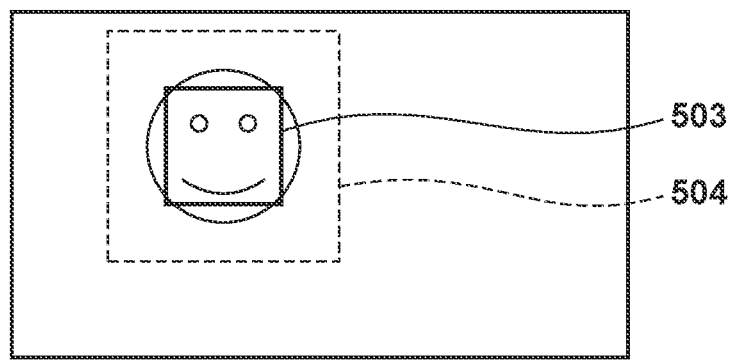

In step S125, an AF frame setting for the time when the subject is detected is performed. FIG. 4B shows an example of setting the AF frame in a case where the focus detection mode is the automatic selection mode and a subject is detected. A main AF frame 503 is automatically set at the detected position of the subject, and an auxiliary AF frame 504 including the main AF frame 503 and larger than the main AF frame 503 is simultaneously set.

In step S124, it is determined whether or not the current state of the camera is the selfie mode for shooting the photographer himself/herself. If it is determined that the camera is in the selfie mode, the process proceeds to step S127; otherwise, the process proceeds to step S126. As an example of determining the selfie mode, for example, it is conceivable to detect that the selfie mode is explicitly set as a camera setting by the photographer, to detect that the movable display device 109 is tilted, and to detect that output of the display device 109 is inverted upside down or horizontally flipped. In addition, it is conceivable to estimate from the features of the positions of the face and arms in the captured image, to detect that the camera on the display device is effective when an image capturing apparatus has a plurality of cameras that shoot different directions, and so forth. However, the present invention is not limited by the determination method.

Figure 4C:
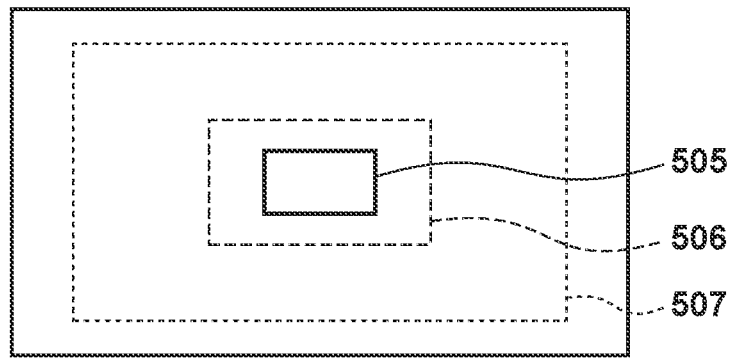

In step S126, the AF frame is set for a case where the self-photographing mode is not set and the subject is not detected. FIG. 4C shows an example of setting the AF frame when the focus detection mode is the automatic selection mode, the selfie mode is not set, and no subject is detected. A fixed main AF frame 505 is set at a predetermined position, and an auxiliary AF frame 506 including the main AF frame 505 and larger than the main AF frame 505 is set at the same time. Further, an entire AF frame 507 for improving the stability as the AF control for a moving image is set to cover the entire screen as a focus detection target.

Figure 4D:
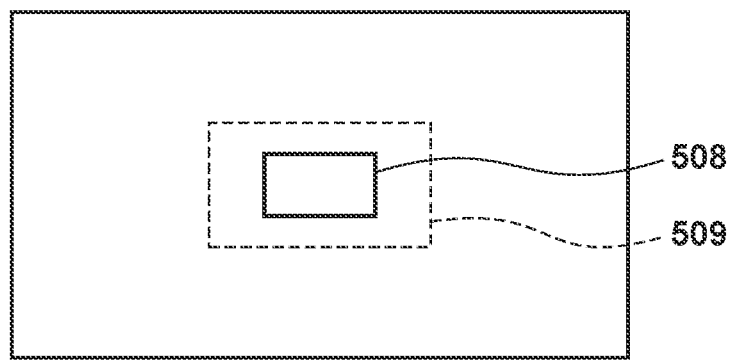

In step S127, the AF frame setting when the subject is not detected in the selfie mode is performed. FIG. 4D shows an example of the AF frame setting when the focus detection mode is the automatic selection mode, the selfie mode is set, and no subject is detected. A fixed main AF frame 508 is set at a predetermined position, and an auxiliary AF frame 509 including the main AF frame 508 and larger than the main AF frame 508 is set at the same time. This point is the same as the AF frame setting in step S126 in the case where the selfie mode is not set. However, in the selfie mode, it is common that a composition in which the main subject is located at the center of the screen is used even if no subject is detected. Therefore, even if no subject is detected, the entire AF frame is not set. Thus, in a case where the subject is not detected in the selfie mode, it is possible to avoid a problem that the periphery of the screen is focused and the main subject at the center of the screen is not focused.

Although the setting of the AF frame in the present invention is as shown in FIGS. 4A to 4D, the number, position, and size of the auxiliary AF frames are not particularly limited and may be arbitrary.

Also, in the examples shown in FIGS. 4A to 4D, the case where the main AF frame and the auxiliary AF frame are set has been described, respectively. However, the present invention is not limited to this, and it is not necessary to set the auxiliary AF frame. Also, an AF frame larger than the auxiliary AF frame may be set.

When an auxiliary AF frame is set, stable AF control can be performed by, for example, weighting the focus signal corresponding to the main AF frame with a larger weight than the focus signal corresponding to the auxiliary AF frame, and averaging the focus signals.

According to the first embodiment as described above, it is possible to increase chances of focusing on a main subject when shooting a moving image in a selfie mode.

Second Embodiment

Next, a second embodiment of the present invention will be described. Note that the configuration of a camera system in the second embodiment is the same as that described in the first embodiment with reference to FIG. 1, and a description thereof will be omitted.

Figure 5:
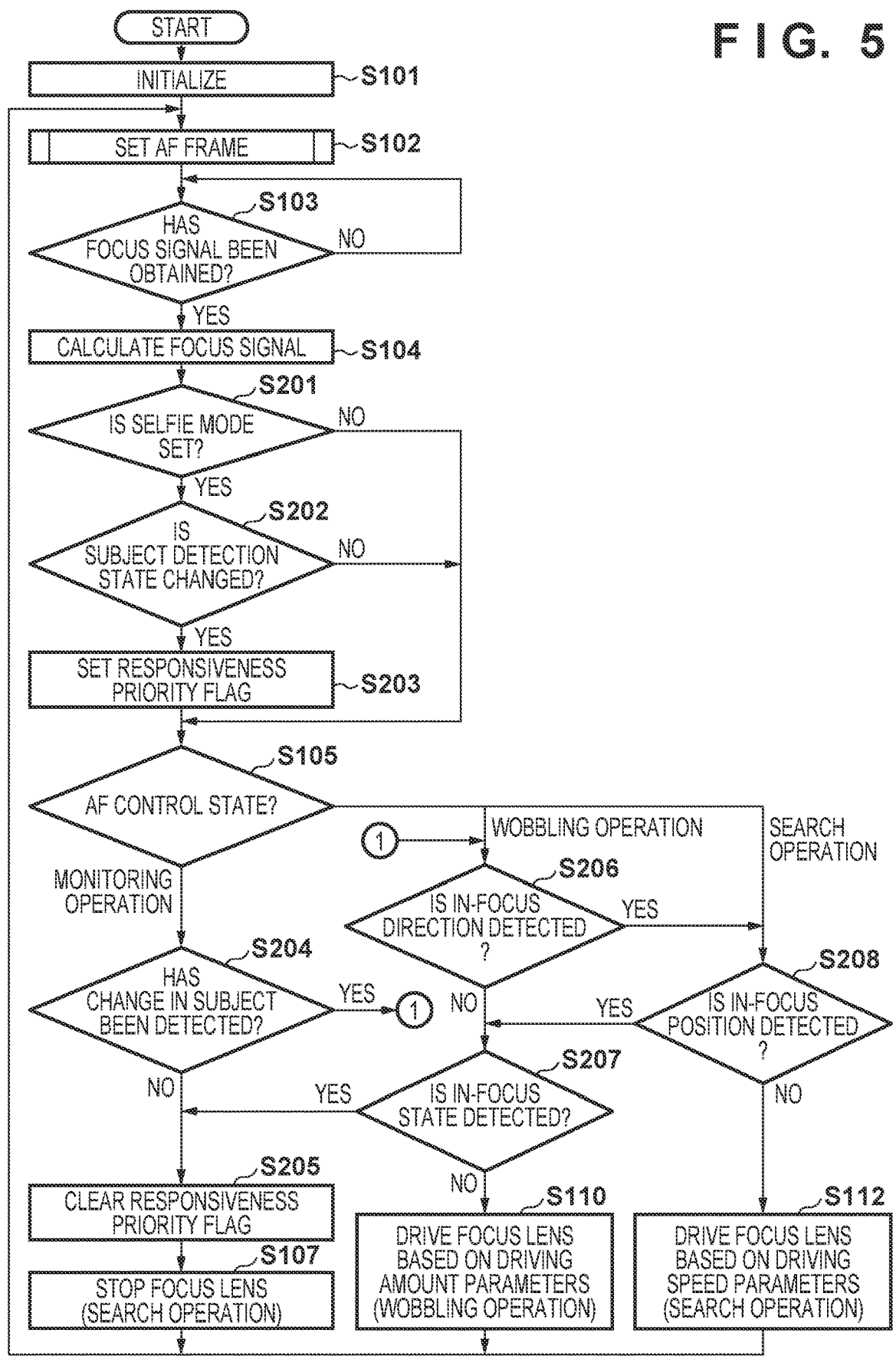
FIG. 5 is a flowchart of AF control for a moving image according to a second embodiment.
Figure 6A:
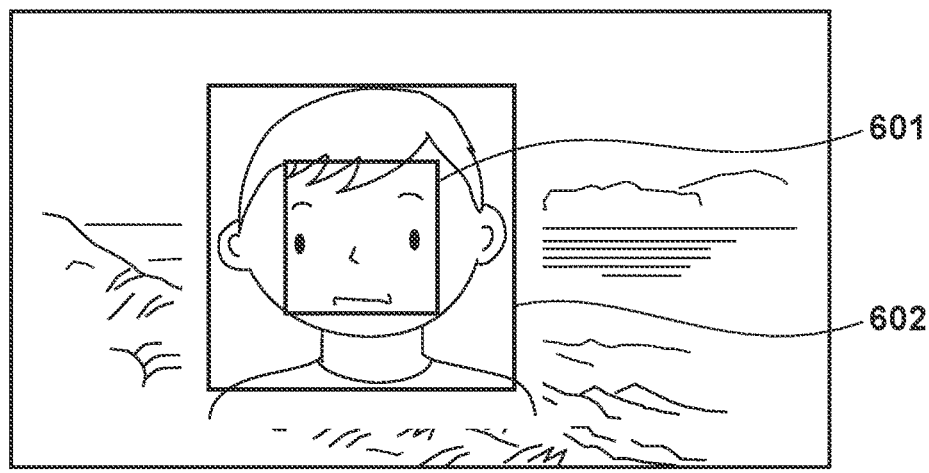
FIGS. 6A to 6C are diagrams for explaining a problem of the related art.
Figure 6B:
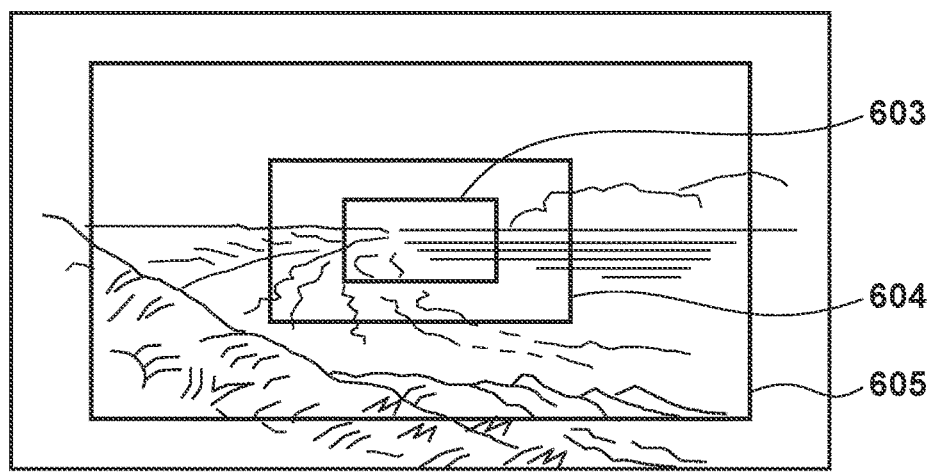
Figure 6C:
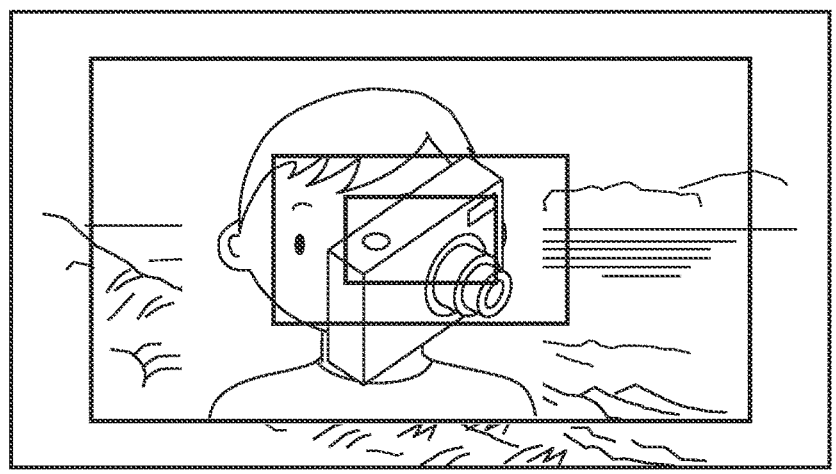

Next, an outline of the AF control for a moving image performed by the camera microcomputer 111 will be described with reference to FIG. 5 FIG. 5 is a flowchart showing the overall flow of the AF control for a moving image. The processing here is mainly performed by the AF control unit 1111 in the camera microcomputer 111 executing a computer program. Note, in FIG. 5, the same processes as those illustrated in FIG. 2 are denoted by the same reference numerals, and description thereof will be omitted as appropriate.

In step S104, when the calculation of the focus signal for each AF frame set in step S102 is completed, the process proceeds to step S201, where it is determined whether or not the current state of the camera is a selfie mode for photographing the photographer himself/herself. If it is determined that the selfie mode is set, the process proceeds to step S202; otherwise the process proceeds to step S105. Note that the method of determining whether or not the camera is set to the selfie mode in step S201 is the same as the method described in step S124 of FIG. 3, and a description thereof will be omitted here.

In step S202, it is determined whether or not a state in which a specific subject such as a face is automatically detected by the camera is switched to a state in which the specific subject is not detected. If it is determined that the state has been switched, the process proceeds to step S203; otherwise, the process proceeds to step S105.

In step S203, a responsiveness priority flag for temporarily improving the responsiveness of the AF operation is set as a countermeasure for a case where the detection state of the specific subject is switched in the selfie mode. This is because, in the selfie mode, there are many compositions in which the main subject is located at the center of the screen even if no subject is detected, compared to the normal shooting mode in which the main subject needs to be selected from the entire screen with priority given to stability, and the possibility that the target to be focused is clear is high.

In step S105, the current AF control state is determined, and the process proceeds to step S204 if the monitoring operation is being performed, to step S206 if the wobbling operation is being performed, or to step S208 if the search operation is being performed as a result of the determination.

In step S204, similarly to step S106 in FIG. 2, the focus signal obtained in step S104 is compared with the focus signal obtained last time to determine whether or not a change in the subject by a predetermined amount or more at which AF control should be restarted is detected. At this time, if the responsiveness priority flag was set in step S203, conditions for changing the state from the monitoring operation to the wobbling operation can be eased, and the time to focus on the subject can be reduced. For example, the value of the above-mentioned predetermined amount is made smaller when the responsiveness priority flag is set than when the responsiveness priority flag is not set.

Further, as an example of detecting a change in the subject, a condition that the change by the predetermined amount or more continues for a predetermined time or more may be used. In that case, the predetermined time is made shorter when the responsiveness priority flag was set in step S203 than when the responsiveness priority flag is not set. By changing the state from the monitoring operation to the wobbling operation when the change by the predetermined amount or more continues for the predetermined time or more, the change in the focus state is stabilized.

By easing the condition when the responsiveness priority flag is set, as described above, priority is given to the responsiveness to change in the focus state corresponding to the scene change, and it is possible to focus on the intended subject. If it is determined that change in the subject has been detected, the process proceeds to step S206; otherwise, the process proceeds to step S205.

In step S205, the responsiveness priority flag set in step S203 is cleared. This is because the responsiveness of the AF operation was temporarily improved when the detection state of the specific subject was switched in the selfie mode, but after the focus operation on a new subject was completed, it is necessary to maintain the normal stability as the AF control for a moving image. When the responsiveness priority flag is cleared, the process proceeds to step S107, and the focus lens 105 is stopped as the monitoring operation.

In step S206, it is determined whether or not the direction in which the in-focus position exists can be detected from the focus signal obtained in step S104 and the focus signals obtained up to the previous loop, similarly to step S108 in FIG. 2. Here, as an example of detecting the direction in which the in-focus position exists, when the center position of reciprocal movement moves in the same direction continuously for a predetermined number of times from the history of the position of the focus lens 105, that direction is determined as the direction in which the in-focus position exists. At this time, if the responsiveness priority flag was set in step S203, conditions for changing the state from the wobbling operation to the search operation can be eased, and the time to focus on the subject can be reduced. If it is determined that the direction in which the in-focus position exists can be detected, the process proceeds to step S208; otherwise, the process proceeds to step S207.

In step S207, the focus signal obtained in step S104 is compared with the focus signals obtained up to the previous loop, and it is determined whether or not the in-focus state is detected, similarly to step S109 in FIG. 2. Here, as an example of determining that the in-focus state is detected, it is determined that the in-focus state is detected in a case where that the focus lens 105 has reciprocated in the same area a predetermined number of times from the history of the positions of the focus lens 105. At this time, by reducing the number of predetermined times used for comparison when the responsiveness priority flag was set in step S203 comparing to a normal situation, conditions for changing the state from the wobbling operation to the monitoring operation can be eased, and the time to focus on the subject can be reduced. If it is determined that the in-focus state is detected, the process proceeds to step S205; otherwise, the process proceeds to step S110, where the focus lens 105 is driven in the wobbling operation based on the driving amount parameters.

In step S208, the focus signal obtained in step S104 is compared with the focus signals obtained up to the previous loop, and it is determined whether or not the in-focus state is detected, similarly to step S111 in FIG. 2. Here, as an example of determining that the in-focus position is detected, it is determined that the in-focus position is detected in a case where the value of the focus signal has decreased by a predetermined amount or more from the maximum value. At this time, by reducing the number of predetermined times used for comparison when the responsiveness priority flag was set in step S203 comparing to a normal situation, conditions for changing the state from the search operation to the wobbling operation can be eased, and the time to focus on the subject can be reduced. If it is determined that the in-focus state is detected, the process proceeds to step S207; otherwise, the process proceeds to step S112, where the focus lens 105 is driven in the search operation based on the driving speed parameters.

According to the second embodiment as described above, in the AF control for a moving image performed by the AF control unit 1111 in the camera microcomputer 111, the focus lens 105 is controlled while repeating the monitoring operation, the wobbling operation, and the search operation so that the focus signal is always maximized. Thus, the in-focus state can be maintained. At this time, by appropriately setting the responsiveness parameter in the selfie mode, it becomes possible to focus on the intended subject with high responsiveness.

Other Embodiments

The present invention can be applied to a system including a plurality of devices, or to an apparatus including one device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-122100, filed on Jun. 28, 2019 which is hereby incorporated by reference herein in its entirety.

What is claimed is:
1. An image capturing apparatus comprising:
an image sensor that repeatedly shoots a subject and outputs image signals;
a detection unit that detects a predetermined subject from the image signals;
a determination unit that determines whether or not a selfie mode for shooting a photographer himself/herself is set; and
a setting unit that sets a focus detection area where focus detection is performed,
wherein the setting unit sets a predetermined focus detection area in a case where the detection unit has failed to detect the predetermined subject and it is determined by the determination unit that the selfie mode is set, and wherein each unit is implemented by one or more processors, circuitry or a combination thereof.

2. The image capturing apparatus according to claim 1, wherein the determination unit determines that the selfie mode is set in a case where the selfie mode is set through an operation by the photographer.

3. The image capturing apparatus according to claim 1, further comprising a movable display device,
wherein the determination unit determines that the selfie mode is set in a case where the movable display device is tilted, and/or a case where output of the display device is inverted upside down or horizontally flipped.

4. The image capturing apparatus according to claim 1, wherein the determination unit determines whether or not the selfie mode is set based on features of positions of the face and arms in a captured image.

5. The image capturing apparatus according to claim 1, further comprising:
a second image sensor whose shooting direction is different from that of the image sensor; and
a display device,
wherein the determination unit determines that the selfie mode is set in a case where shooting is performed using either of the image sensor or the second image sensor that is provided on a side on which the display device is arranged.

6. The image capturing apparatus according to claim 1, further comprising:
a focus detection unit that detects a focus state based on an image signal in the focus detection area; and
a control unit that controls driving of a focus lens based on the focus state detected by the focus detection unit,
wherein each unit is implemented by one or more processors, circuitry or a combination thereof.

7. The image capturing apparatus according to claim 6, wherein, in a case where it is determined by the determination unit the selfie mode is set and there is a change between a state where the subject is detected by the detection unit and a state where the subject is not detected, the control unit increases responsiveness of driving control for the focus lens with respect to the focus state comparing to a case where there is no change between the states.

8. The image capturing apparatus according to claim 7, wherein the control unit controls transitioning between a first mode in which the focus lens is stopped, a second mode in which the focus lens is driven for a predetermined driving amount, and a third mode in which the focus lens is driven at a predetermined driving speed, and
in a case where it is determined by the determination unit that the selfie mode is set and there is a change between the state where the subject is detected and the state where the subject is not detected by the detection unit, the control unit eases conditions that cause transitioning between the first mode and the second mode, and transitioning between the second mode and the third mode occur comparing to a case where there is no change between the states.

9. The image capturing apparatus according to claim 1, wherein the focus detection area set in a case where the detection unit has failed to detect the predetermined subject and it is determined by the determination unit that the selfie mode is set, is smaller than a focus detection area set in a case where the detection unit has failed to detect the predeteremined subject and it is determined by the determination unit that the selfie mode is not set.

10. A focus control method comprising:
repeatedly shoots a subject and outputting image signals;
detecting a predetermined subject from the image signals;
determining whether or not a selfie mode for shooting a photographer himself/herself is set; and
setting a focus detection area where focus detection is performed,
wherein a predetermined focus detection area is set as the focus detection area in a case where the predetermined subject is not detected and it is determined that the selfie mode is set.

11. The focus control method according to claim 10, further comprising:
detects a focus state based on the image signal in the focus detection area; and
controlling driving of a focus lens based on the detected focus state,
wherein, in a case where it is determined that the selfie mode is set and there is a change between a state where the subject is detected and a state where the subject is not detected, responsiveness of driving control for the focus lens with respect to the focus state is increased comparing to a case where there is no change between the states.

12. A non-transitory computer-readable storage medium, the storage medium storing a program that is executable by the computer, wherein the program includes program code for causing the computer to perform a focus control method comprising:
repeatedly shoots a subject and outputting image signals;
detecting a predetermined subject from the image signals;
determining whether or not a selfie mode for shooting a photographer himself/herself is set; and
setting a focus detection area where focus detection is performed,
wherein a predetermined focus detection area is set as the focus detection area in a case where the predetermined subject is not detected and it is determined that the selfie mode is set.

* * * * *